United States Patent Office 3,551,124
Patented Dec. 29, 1970

3,551,124
PROCESS OF GASIFYING HYDROCARBON FRACTIONS CONTAINING SULFUR
Takayuki Iwaki, Tokyo, Shohachi Egashira, Sagamihara-shi, and Akio Okagami, Tokyo, Japan, assignors to Japan Gasoline Co., Ltd., Tokyo, Japan
Filed Feb. 14, 1966, Ser. No. 527,164
Claims priority, application Japan, Feb. 17, 1965, 40/9,066
Int. Cl. C01b 2/14; C10g 23/02
U.S. Cl. 48—214                                6 Claims

ABSTRACT OF THE DISCLOSURE

A hydrocarbon feed stock containing sulfur and hydrocarbons having 3 or more carbon atoms is subjected to hydrodesulfurizing treatment with a sulfided nickel catalyst using a CO and $CO_2$ containing hydrogen gas to hydrogenate the sulfur compounds. The hydrogenated sulfur compounds are removed from the feed stock, steam is added to the feed stock which is then steam reformed.

---

Figure 1:
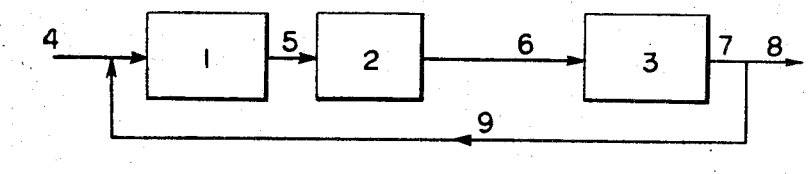

The present invention relates to a hydrocarbon gasifying process which is a combination of a novel hydro-desulfurization process and a steam-reformation process, and more particularly, relates to an extremely simplified process for obtaining reformed gas containing $H_2$, $CH_4$, CO and $CO_2$ from a hydrocarbon feed stock containing sulfur and hydrocarbons having three or more carbon atoms and having an end boiling point of 220° C. or less. The process comprises subjecting such hydrocarbon feed stock to hydro-desulfurizing treatment utilizing a specific sulfided nickel catalyst and using a CO and $CO_2$-containing hydrogen gas to effect hydrogenation of the sulfur compounds contained in the feed stock and convert same into hydrogen sulfide. The process further comprises removing said hydrogen sulfide, adding steam to the purified hydrocarbon feed stock and subsequently subjecting the mixture to a steam-reforming process to cause reaction therein, while discharging a part of the thus reformed gas and recycling another part of the reformed gas, without removing CO and $CO_2$ therefrom, to the hydro-desulfurization step for use as the hydrogen-containing gas, to thereby obtain a reformed gas containing $H_2$, $CH_4$, CO and $CO_2$.

It is known that the hydro-desulfurization of hydrocarbons containing sulfur compounds by the use of a CO and/or $CO_2$-containing hydrogen gas is accompanied by heat generation of a considerable magnitude because of the presence of the CO and/or $CO_2$. In such a case, there occurs hydrogenation of the CO and/or $CO_2$ leading to the formation of $CH_4$ resulting in disadvantages such as an excessive elevation of the reaction temperature, a marked reduction in the utilization of hydrogen and deterioration of the catalyst involved. Such difficulties have heretofore been avoided by the use of a hydrogen-containing gas free from CO and $CO_2$, or by removing CO and $CO_2$ by some means or other prior to the use of the gas in order to provide purified gas to the hydro-desulfurizing process. When, for example, coke oven gas or coal gas containing CO and $CO_2$ was used as the hydrogen-containing gas in the hydro-desulfurizing process, it was necessary to remove the CO and $CO_2$ from such gases before such gases were used in the hydro-desulfurizing process as the hydrogen-containing gas. The removal was effected by subjecting such CO and $CO_2$-containing gas to a gas purifying process comprising, for example, CO conversion, $CO_2$ absorption or preliminary hydrogenation. Such gas purifying process involved a considerable cost, and never was desirable from an economic point of view. Another example concerns a preliminary step which was employed in hydro-desulfurizing of the hydrocarbon feed stocks to be used in the catalytic steam reforming process, and in this step the reformed gas produced during the reaction was utilized as the desulfurizing hydrogen-containing gas in the desulfurizing process. In this latter example, also, the reformed gas was freed of CO and $CO_2$ contained therein through a series of steps such as CO conversion, $CO_2$ absorption and further possibly through methanation before utilizing such gas as the hydrogen-containing gas.

The present invention contemplates the provision of an extremely efficient and highly economic process which permits the use of a part of the reformed gas produced during the process as the hydrogen-containing gas in the hydro-desulfurizing process without requiring such reformed gas to undergo any step of removing CO and $CO_2$ therefrom, by the employment of a specific hydro-desulfurizing catalyst having an epoch-making selectivity of of such nature as will cause no hydrogenation of CO and $CO_2$ during the process of hydro-desulfurization even when a hydrogen-containing gas having CO and $CO_2$ is used without being previously purified.

It is, therefore, the object of the present invention to provide a simplified and economic method comprising the combination of a hydro-desulfurizing process with a steam-reforming process.

The process of the present invention comprises the combination of a hydro-desulfurizing process with a steam-reforming process, the former including the steps of subjecting a hydrocarbon fraction containing sulfur compounds and hydrocarbons of three or more carbon atoms and having an end boiling point of 220° C. or less to a catalytic hydro-desulfurizing treatment to thereby convert the sulfur compounds therein contained into hydrogen sulfide and separating and removing the formed hydrogen sulfide by means of a hydrogen sulfide removing apparatus, and the latter process including the steps of subjecting the hydro-desulfurized hydrocarbon fraction to a steam-reforming reaction, thereby producing a reformed gas containing $H_2$, CO, $CO_2$ and $CH_4$. A part of the reformed gas thus produced is recycled to the hydro-desulfurizing process for use as the hydrogen-containing gas without the CO and $CO_2$ being removed therefrom. This unique process of the present invention can be realized only with the use of such a nickel sulfide catalyst as will be described as the catalyst for the hydro-desulfurizing process.

The catalyst for use in the hydro-desulfurizing process of the present invention consists of a solid catalyst containing, as its principal metal component, substantially sulfided nickel in the atomic ratio of sulfur to nickel ranging from 0.5 to 0.8. The nickel content is at least 50%, by weight, of the total metal components constituting the catalyst. The catalyst may have, in coexistence with the nickel, such transition metals as copper, chromium, manganese and zinc either solely or as a mixture of more than one thereof. The total content of the metal components of the catalyst, the reduced state, ranges from 1 to 60%, by weight, of the total catalyst weight. The selectivity of the catalyst can be improved by forming it in such manner that the surface of the granular catalyst is densely coated with these metal components. While the manner of sulfiding the catalyst does not at all restrict the scope of the present invention, it may facilitate an understanding of the present invention to introduce a few examples of the steps of sulfiding the catalyst. One example includes the steps of reducing the catalyst with hydrogen-containing gas and subsequently sulfiding the reduced catalyst under 200° C. and a hydrogen-containing gas supplied at the rate of 500 volumes/hr. in terms of hydrogen and concurrently with carbon disulfide gas supplied at the rate of 10 volumes/hr. in terms of carbon disulfide whereupon the catalyst is gradually sulfided, starting at the portion closer to the inlet of the latter gas. By such treatment, the atomic ratio of sulfur to nickel will reach a value ranging from 0.5 to 0.8 by averaging the values of the total metal component or components. A nickel catalyst in the desired sulfided state may also be obtained by reducing, with hydrogen and at a temperature of 350° C., a catalyst which has been impregnated with nickel sulfate. The carriers which are used in the process of the present invention may be any of the ordinary carriers including inorganic oxides such as alumina, silica and magnesia.

The hydro-desulfurizing reaction of the present invention is carried out by using the specific nickel sulfide catalyst as has been described above under the following conditions, namely, at a temperature ranging from 200° C. to 450° C., a reaction pressure ranging from atmospheric pressure to 100 kg./cm.$^2$ gauge, a mol ratio of hydrogen-containig gas to hydrocarbon feed stock ranging from 0.1 to 10, and a liquid hourly space velocity ratio of feed stock to catalyst, by volume per hour, ranging from 0.2 to 30.

In the hydrogen sulfide removing apparatus, the reaction product from the hydro-desulfurization vessel is freed of hydrogen sulfide. The procedure for removing said hydrogen sulfide may be any of the known methods including the adsorption method which uses a solid adsorbent such, for example, as activated charcoal, iron oxide or zinc oxide; the washing method which uses an aqueous solution of such substance as alkali or amine; and the stripping method.

Of these methods, the adsorption method permits the removal of hydrogen sulfide under pressure without the need to cool the hydro-desulfurized products. For this reason, the adsorption method is industrially most advantageously coupled with the steam-reforming process.

The thusly desulfurized hydrocarbon feed stock is then subjected to the steam-reforming process, where the hydrocarbon is contacted with steam to undergo reforming and the desired reformed gas is thus obtained. The reforming catalyst used in the steam-reforming process comprises, in general, a nickel catalyst, but the most preferred catalyst comprises a multicomponent nickel catalyst which contains copper, chromium and manganese in a ratio such that the total content of the former three metal components to nickel is 0.1 or less.

The steam-reforming conditions applicable to the process of the present invention are a temperature which ranges from 300° C. to 950° C., a pressure ranging from atmosphere pressure to 50 kg./cm.$^2$ gauge; and appropriate mol ratio of steam to 1 carbon atom of hydrocarbon feed stock is in the range from 1 to 7.

The product, i.e., the reformed gas thus obtained contains such substances as $H_2$, $CO$, $CO_2$ and $CH_4$. It is amazing to note, however, that according to the process of the present invention, the reformed gas can be recycled to the hydrocarbon feed stock supply pipe at a point close to the hydro-desulfurizing zone without the need for removing therefrom the carbon oxides such as $CO$ and $CO_2$ contained therein. In the case where the hydrogen content of the reformed gas is 10 vol. percent or more, the gas can be recycled to the hydrocarbon feed stock supply pipe without going through the step of removing $CO$ and $CO_2$.

By referring now to FIG. 1 of the drawings, there is seen to be no need for providing a gas removing unit for line 9 in FIG. 1, with the possible exception of an additional equipment for appropriately regulating the pressure and the temperature of the reformed gas, including, for example, a compressor.

In actual practice of the process of the present invention, however, it occurs not infrequently that reformed gas having a hydrogen content of 50 vol. percent or less is used. It is to be noted, however, that even in the case where the hydrogen content of the reformed gas is as low as 30 vol. percent or less, still the operation will not be affected in the least.

The feed stock which is used in the process of the present invention includes petroleum hydrocarbon fractions containing sulfur compounds and having an end boiling point of 220° C. or less, and these hydrocarbon fractions include fractions of petroleum such as liquefied petroleum gas, straight run naphtha, and liquefied gas and gasoline from thermal cracking, from catalytic cracking or from catalytic reforming, and hydrocarbons of coal origin such as coke oven light oil, oil-gas light oil and tar light oil.

Figure 2:
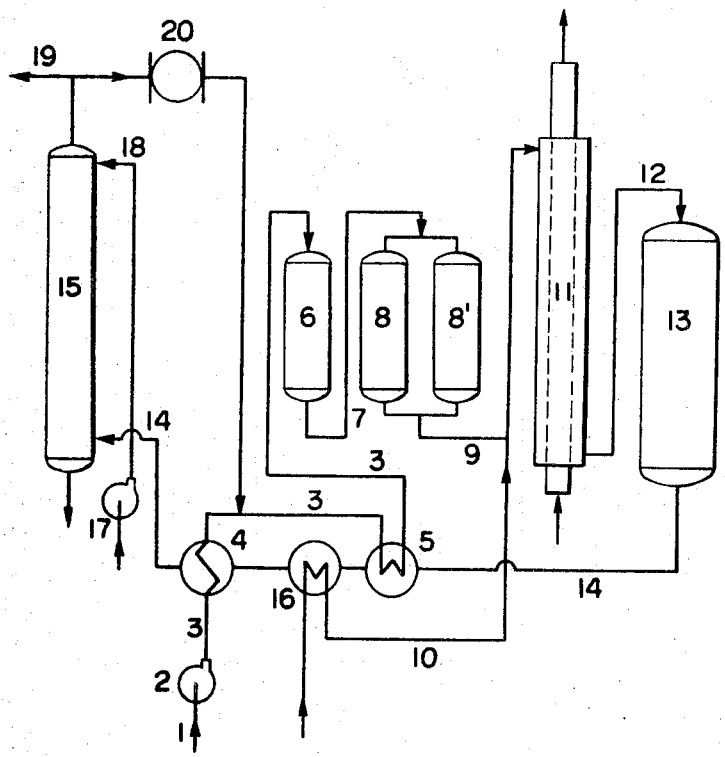

The present invention will be more clearly understood by reading the following detailed descriptions of some of the preferred embodiments of the present invention in connection with the accompanying drawings which are provided by way of example only, in which:

FIG. 1 is a block diagram intended to illustrate the individual steps of the process of the present invention; and FIG. 2 is a diagrammatic representation of the individual steps, in a more detailed manner, of the process in a preferred embodiment of the present invention.

In FIG. 1, hydrocarbon feed stock 4 containing sulfur is fed, together with recycle gas, to a hydro-desulfurization zone 1 packed with solid catalyst intended for hydrogenation. The hydrocarbon feed stock 4 is hydrogenated in this zone and is introduced therefrom to a hydrogen sulfide removing apparatus 2 through a pipe 5. After being freed and separated from the hydrogen sulfide, the hydrocarbon feed stock is transferred through a pipe 6 to a steam-reforming zone 3 to be subjected to a steam-reforming reaction. The gas which has been reformed in said zone 3 is discharged through a pipe 7. A part of this discharged gas is recycled, as the hydrogen-containing gas, through a pipe 9 to the hydro-desulfurization zone 1 together with the hydrocarbon feed stock which contains sulfur. The remainder of the reformed gas is led, through a pipe 8, to a storage tank, for example, as the final product.

In FIG. 2, a hydrocarbon feed stock 1 containing sulfur is adjusted to a predetermined level of pressure by means of a pump 2, and thus pressurized feed stock is fed, through a pipe 3, to an evaporator 4 and thence to a heat exchanger 5. After being gasified and preheated in units 4 and 5, the feed stock is first introduced into a hydrogenation vessel 6. The hydrocarbon feed stock which has been hydro-desulfurized in this vessel 6 is then fed to a hydrogen sulfide removing vessel 8 or 8' through a pipe 7. Removal of hydrogen sulfide in such reaction system, in general, is conducted by operating the two adsorption beds 8 and 8' alternately. The hydrocarbon feed stock which has been freed of its sulfur ingredients in the hydrogen sulfide removing vessels 8 and 8' is withdrawn therefrom through a pipe 9. Then, the feed stock in gaseous form is mixed with a predetermined amount of steam which is supplied through a pipe 10. The mixture of gaseous hydrocarbon and steam is then transferred to a preheater 11, where the temperature of the mixed gas is raised to a predetermined level by virtue of the combustion heat from such fuel as fuel oil or fuel gas.

The heated mixture of gas is then withdrawn from the preheater 11 and transferred, through a pipe 12, to a steam-reformer 13. Here, the hydrocarbon feed stock reacts with the steam, and a so-called reformed gas is produced. The reformed gas thus produced is then transferred to a cooling tower by a pipe 14. However, the heat of the reformed gas is effectively utilized by subjecting this gas to heat exchange with both the hydrocarbon feed stock and the steam, en route to the cooling tower, in the heat exchangers 5 and 16 and also in the evaporator 4.

The reformed gas which has entered cooling tower 15 through a pipe 14 is cooled therein by being contacted with a cooling water which flows downwards from an upper portion of the tower. The cooling water is supplied to the upper portion of the cooling tower by means of a pump 17 and through a pipe 18.

The cooled reformed gas is withdrawn from the top of the cooling tower. The major portion of the withdrawn reformed gas from the cooling tower is transferred to a storage tank through a pipe 19 to be stored there as the final product. The remainder of the discharged reformed gas is pressurized by a compressor 20 and is led to the hydrocarbon feed stock supply pipe 3 to be mixed with the hydrocarbon feed stock supplied therethrough, and the mixture is led into the hydro-desulfurization vessel. Examples 2 and 3 which will be described later were conducted by using such system as shown in FIG. 2.

EXAMPLE 1

Commercial butane at the rate of 58 kg./hr. and containing 20 p.p.m. of sulfur (calculated as pure sulfur) is introduced together with a recycle stream of reformed gas at the rate of 6.1 Nm.$^3$/hr. of a composition to be described below, to a hydro-desulfurization vessel packed with an alumina carrier-supported catalyst containing nickel in the amount of 15% by weight based on the catalyst, and hydro-desulfurization of the butane was performed under the following conditions, namely, at a reaction temperature of 300° C., a reaction of 2 kg./cm.$^2$ gauge, and a liquid hourly space velocity of 8.8. The catalyst contained sulfur in an atomic ratio of sulfur to nickel of 0.65.

The hydro-desulfurization was followed by feeding the resulting gas to an hydrogen sulfide removing vessel, where hydrogen sulfide was separated and removed by being adsorbed by a ZnO adsorbent at a temperature of 280° C. and a pressure of 1.5 kg./cm.$^2$ gauge. Analysis conducted on the butane discharged from the hydrogen sulfide removing vessel showed the weight of the sulfur content to be 1 p.p.m. or less. Then, the desulfurized butane was mixed with steam at the rate of 180 kg./hr. and was preheated. The mixture of butane and steam was then introduced to a steam-reformer. This steam-reformer, being heated externally, was of the type commonly used in high temperature steam reforming processes. The catalyst used was an alumina-silica carrier-supported catalyst containing nickel in the amount of 15% by weight based on the total weight of catalyst. The amount of packed catalyst was 360 kg., and reforming was conducted under the following predetermined conditions: the temperature of gas at the outlet of the reformer was 850° C. and the pressure of gas at the outlet of the reformer was 0.5 kg./cm.$^2$ gauge. The reformed gas produced in the reformer was quenched with cooling water and was further cooled to room temperature. The major portion of the cooled gas was led to a storage tank, and the remainder of the gas was recycled to the hydro-desulfurization vessel as the hydro-desulfurizing hydrogen gas. The reformed gas was obtained at the rate of 340 Nm.$^3$/hr. (calculated as dry gas), and the composition of the obtained gas was as follows:

Composition of product gas
(as dry gas): Vol. percent
$H_2$ ---------------------------------------- 73.5
CO ---------------------------------------- 12.6
$CO_2$ ---------------------------------------- 13.9
$CH_4$ ---------------------------------------- Trace

EXAMPLE 2

In this example, the system as shown in FIG. 2 was used. The feed stock was a naphtha fraction of Middle East crude oil with the following physical properties: an initial boiling point of 41° C., a 50% boiling point of 75° C. and an end boiling point of 128° C.; a specific gravity ($d_4^{15}$) of 0.680, and a sulfur content by weight of 262 p.p.m.

Said feed stock naphtha was introduced together with a stream of reformed recycle gas of a composition to be described below to a hydro-desulfurization vessel packed with an alumina carrier-supported catalyst containing nickel in an amount of 15% by weight based on the total weight of catalyst, said naphtha being introduced at the rate of 285 kg./hr. and said reformed recycle gas being introduced at the rate of 19.2 Nm.$^3$/hr. Hydro-desulfurization was performed in said vessel under the conditions: reaction temperature: 320° C., reaction pressure: 12 kg./cm.$^2$ gauge, and liquid hourly space velocity: 4. This catalyst used in the hydro-desulfurization stage contained sulfur in the atomic ratio of sulfur to nickel of 0.65. Following the hydro-desulfurizing process, the desulfurized naphtha was conducted to a hydrogen sulfide removing vessel, where it was freed of the hydrogen sulfide by being adsorbed by a ZnO adsorbent at 300° C. at a pressure of 11.5 kg./cm.$^2$ gauge. The naphtha from the hydrogen sulfide removing vessel was analyzed with the result that the sulfur content was 1 p.p.m. or less. In other words, 99.6% or more of the sulfur was removed. The naphtha after being freed of hydrogen sulfide was mixed with steam which was furnished at the rate of 725 kg./hr. and the naphtha was preheated, and the mixture was transferred to a steam-reformer. The catalyst used in the reformer was a nickel-containing reforming catalyst. The weight of the packed catalyst was 340 kg., and reforming was conducted under the following conditions: the pressure of gas at the outlet of the reformer was 10 kg./cm.$^2$ gauge and the temperature of gas at the outlet of the reformer was 500° C. The reformed gas produced in the steam-reformer was subjected to cooling in a cooling tower prior to storing the major portion thereof as the final product. The remainder of the reformed gas was recycled to the hydro-desulfurization vessel as the hydrogen-containing gas to be used in the hydro-desulfurizing process. The yield of this product gas calculated as dry gas equivalent was 600 Nm.$^3$/hr. and the composition was as follows:

Composition of product gas
(as dry gas): Vol. percent
$H_2$ ---------------------------------------- 25.2
CO ---------------------------------------- 1.1
$CO_2$ ---------------------------------------- 22.1
$CH_4$ ---------------------------------------- 51.6

EXAMPLE 3

In this example, the system as shown in FIG. 2 was used. The feed stock was a naphtha fraction of Middle East crude oil, the physical properties being such that the initial boiling point was 39.5° C., the 50% boiling point was 83.0° C. and the end boiling point was 147° C.; the specific gravity ($d_4^{15}$) was 0.706; and the sulfur content was 300 p.p.m. by weight.

This naphtha feed stock was introduced at the rate of 85 kg./hr. together with a stream of reformed recycle gas of a composition to be described below and which was furnished at the rate of 6.7 Nm.$^3$/hr., to a hydro-desulfurization vessel packed with diatom-earth-supported catalyst containing nickel 43%, by weight of nickel based on the total weight of catalyst. Hydro-desulfurization was performed under the conditions: reaction temperature of 300° C., reaction pressure of 2.5 atms., and the liquid hourly space velocity of 1.0. The catalyst contained sulfur in the atomic ratio of sulfur to nickel of 0.65. The effluent from the hydro-desulfurization vessel was then transferred to a hydrogen sulfide removing vessel where it was freed of hydrogen sulfide by being adsorbed by ZnO adsorbent at a temperature of 280° C. and a pressure of 2 atms. Analysis of the naptha withdrawn from the hydrogen sulfide removing vessel was conducted with the result that the sulfur content was 2 p.p.m. This means that the percentage of desulfurization was 99.3. The naptha which was freed of hydrogen sulfide was then mixed with steam which was furnished at the rate of 432 kg./hr. and the naphtha was preheated. This mixture was then introduced to a steam-reformer. The catalyst used in the reformer was a silica-alumina-magnesia catalyst containing nickel 20% and potassium 2% by weight based on the total weight of catalyst. The amount of the packed catalyst was 150 kg. and reforming was performed under the following conditions: the temperature of gas at the outlet of the reformer was 550° C. and the pressure of gas at the outlet of the reformer was 1 atm. The reformed gas produced in the steam-reformer was cooled in a cooling tower. The major portion of the cooled gas was stored as the final product while the remainder was recycled to the hydro-desulfurization vessel as the hydrogen-containing gas for use in the hydro-desulfurizing stage. The yield of the product gas calculated as the dry gas equivalent was 415 Nm.$^3$/hr. and the composition of the gas was as follows:

Composition of product gas

| (as dry gas): | Vol. percent |
|---|---|
| $H_2$ | 67.7 |
| CO | 4.9 |
| $CO_2$ | 20.6 |
| $CH_4$ | 6.8 |

What is claimed is:

1. A process for gasifying a hydrocarbon fraction containing sulfur, said process comprising hydrodesulfurizing a hydrocarbon fraction containing sulfur compounds and hydrocarbons having three or more carbon atoms and having an end boiling point of at most 220° C. in a hydro-desulfurizing zone in the presence of a solid catalyst, said solid catalyst comprising as a principal component sulfided in an atomic ratio of sulfur to nickel ranging from 0.5 to 0.8, to thereby convert said sulfur compounds to hydrogen sulfide, separating and removing said hydrogen sulfide from the hydrogenated hydrocarbons, reacting steam with the resulting hydrogen sulfide free hydrocarbon fraction to effect catalytic steam-reforming of the hydrocarbon fraction in the presence of a nickel-containing reforming catalyst to produce a reformed gas containing $H_2$, CO, $CO_2$ and $CH_4$, and recycling a part of the gas thus reformed to said hydro-desulfurizing zone as the hydrogen-containing gas without removing the CO and $CO_2$ contained therein; said hydro-desulfurization being effected at a temperature ranging from 200° C. to 450° C., a pressure ranging from atmospheric pressure to 100 kg./cm.$^2$ gauge, and a hydrogen-containing gas to hydrocarbon fraction mol feed ratio ranging from 0.1 to 10, and a liquid hourly space velocity ratio of feed stock to solid catalyst ranging from 0.2 to 30.

2. A process as claimed in claim 1, wherein a solid adsorbent is used for the separation and removal of hydrogen sulfide.

3. A process as claimed in claim 1, wherein the reforming catalyst used in the steam-reforming step contains manganese, chromium and copper in addition to nickel as the metal components and the total content of said manganese, chromium and copper is 10% or less, by weight, based on the total weight of nickel.

4. A process as claimed in claim 1, wherein the steam is added, in the steam-reforming process, in a mol ratio of steam to 1 carbon atom of hydrocarbon ranging from 1 to 7, and the steam-reforming step is effected at a temperature ranging from 300° C. to 950° C., and a pressure ranging from atmospheric pressure to 50 kg./cm.$^2$ gauge.

5. A process as claimed in claim 1, wherein said catalyst in the hydro-desulfurizing zone includes at least one transition metal component, the nickel being present in an amount of at least 50% by weight of the total metal components, the total weight of the reduced metal components being from 1 to 60% of the total catalyst weight.

6. A process as claimed in claim 5, wherein said transition metal is selected from the group consisting of copper, chromium, manganese and zinc.

References Cited

UNITED STATES PATENTS

| 3,012,963 | 12/1961 | Archibald | 208—217 |
| 2,071,286 | 2/1937 | Johnson et al. | 48—214X |
| 3,192,153 | 6/1965 | Smilski | 208—213X |
| 2,512,570 | 6/1950 | Sartor | 208—215 |
| 3,081,258 | 3/1963 | Van Dongen et al. | 208—213 |
| 3,061,421 | 10/1962 | Landau et al. | 48—197 |
| 3,103,423 | 9/1963 | Pearce | 48—214 |
| 2,995,511 | 8/1961 | Herbert et al. | 208—217 |
| 3,415,634 | 12/1968 | Dent et al. | 48—213 |

JOSEPH SCOVRONEK, Primary Examiner

U.S. Cl. X.R.

23—212; 48—197, 213; 208—212, 217